United States Patent [19]
Mooney

[11] Patent Number: 5,487,330
[45] Date of Patent: Jan. 30, 1996

[54] TACO BAKING AND SERVING PAN

[76] Inventor: Audrey J. Mooney, 2511 N. Riverside Dr., Pompano Beach, Fla. 33062

[21] Appl. No.: 391,214

[22] Filed: Feb. 21, 1995

[51] Int. Cl.$^6$ ..................................................... A47J 37/01
[52] U.S. Cl. .................. 99/425; 99/426; 99/441; 99/445; 249/120
[58] Field of Search .................. 99/426, 427, 428, 99/441, 442, 425, 445; 425/403, 470, 472; 211/13, 60.1; 248/174; 249/120, 119

[56] References Cited

U.S. PATENT DOCUMENTS

| | | | |
|---|---|---|---|
| D. 335,406 | 6/1993 | Wytiuk | D7/359 |
| D. 335,425 | 5/1993 | Shular | D7/504 |
| 3,705,042 | 12/1972 | Muse. | |
| 3,994,213 | 11/1976 | Brezinski | 99/441 |
| 4,746,010 | 5/1988 | Fournier | 211/13 |
| 4,974,502 | 12/1990 | Murdock | 99/426 |
| 5,009,151 | 4/1991 | Hungerford | 99/445 |
| 5,232,609 | 8/1993 | Prevost et al. | 99/441 |

*Primary Examiner*—David Scherbel
*Assistant Examiner*—Reginald L. Alexander
*Attorney, Agent, or Firm*—Alvin S. Blum

[57] ABSTRACT

A pan is provided for baking taco shells in an oven for holding the baked shells while filling and serving. The pan has a plurality of elongate parallel tapered ridges with troughs between the ridges. The inverted shell is placed astride a ridge. As the shell is pushed onto the tapered ridge it is gradually opened up. It is held in this open position during baking and retains this open configuration when turned upright and seated in a trough where it is fully supported during filling and serving. At each end of the trough, a stop element slopes upward from the bottom of the trough. It is high enough to retain any spilled contents in the trough as well as preventing the tacos from sliding off the pan when tilted. The stop element also serves to facilitate grasping of the filled taco from below by gradually lifting up the taco as it is slid along the trough and over the stop element.

9 Claims, 1 Drawing Sheet

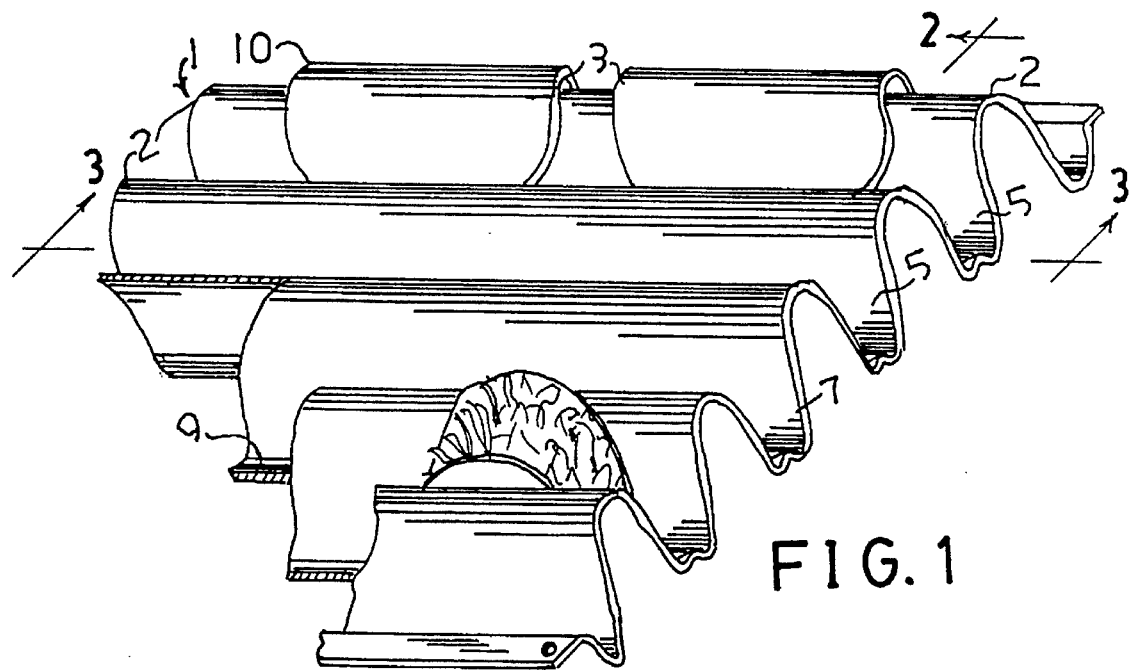
FIG. 1
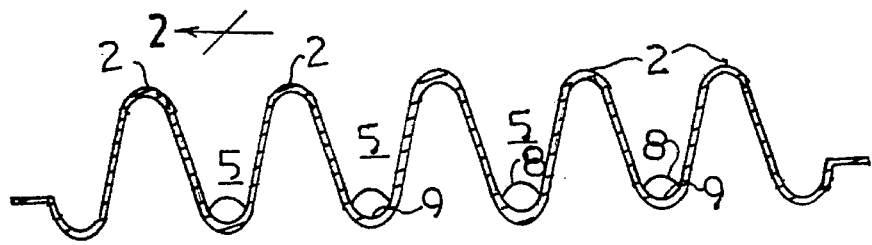
FIG. 2
FIG. 3
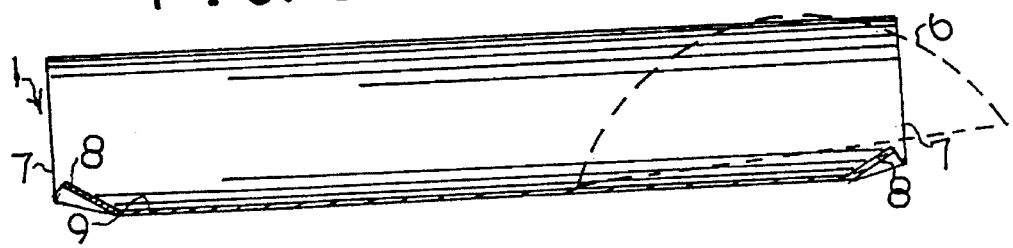

TACO BAKING AND SERVING PAN

BACKGROUND OF THE INVENTION

This invention relates to culinary implements and more particularly to a pan for baking taco shells and for holding the baked shells for filling and serving them.

Tacos are made from tortillas that are first fried in a U-shaped configuration to make a taco shell. These are sold in a soft and flexible form because they would be too brittle otherwise. When ready for use they are laid on a flat pan and baked until crisp. Unfortunately, they tend to close up when laid on their side during baking, so that they hold little filling and may crack when spread open by the filling. To fill the crisp taco shell, it is held in one hand and filled by the other hand with pieces of lettuce, onion, cheese, meat, sauce and the like. Once filled, it must be held in the hand while eaten to avoid spilling the contents.

Utensils have been developed for cooking the shells while maintaining the shape as exemplified by U.S. Pat. No. 3,705,042 to Muse. U.S. Pat. No. 4,004,501 to Guerrero shows a taco holding tray for holding the shells upright for filling and serving. A series of parallel troughs have walls conforming to the shell shape. The walls are short enough so that the top of the shells extend above them. This enables the user to grasp the two top edges of the filled shells and lift the shell up for eating. If this is done with one hand, the two edges must be squeezed together to lift it. This may cause the shell to crack if it is brittle. Her tray has gutters along both ends of the troughs to hold any materials spilling from the troughs.

It would be useful to provide a pan that could be used both for baking the shells while keeping them open and for holding the shells while filling.

It would also be useful if the pan could provide means for conveniently lifting the taco with one hand without breakage.

SUMMARY OF THE INVENTION

It is accordingly an object of the invention to provide a pan that will support the taco shells in a proper configuration while baking to prevent them from closing, and that will also hold the shells securely while filling them. It is another object that the pan provide for easy lifting of the filled taco with less trauma to the brittle shell. It is yet another object that the pan prevent loss or spilling of the taco or its contents when tilted. The pan of the invention comprises a plurality of U-shaped troughs whose surface has the cross sectional shape of a properly shaped taco shell and a length greater than the length of taco shell so that a shell will be supported therein during filling. The two sides of the trough extend upward and away from each other high enough to support most or all of the shell. At each end of the trough, the bottom of the trough is provided with a stop means contiguous with the surface of the trough and sloping upward therefrom. This stop prevents the shells from sliding out if the pan is tilted when being lifted from the oven. This same stop also prevents any of the filling which may spill from the taco from falling out of the trough. The sloping stop means also provides a means of lifting the taco from below. By sliding the taco along the trough and onto the stop, the bottom of the taco is gradually lifted. As it extends beyond the pan, the bottom of the taco is lifted enough that a hand can be slipped underneath it even when the pan is resting on a table.

These and other objects, features and advantages of the invention will become more apparent when the detailed description is studied in conjunction with the drawings.

BRIEF DESCRIPTION OF THE DRAWINGS

FIG. 1 is a perspective view of the pan of the invention, partially broken away.

FIG. 2 is a sectional view, taken on line 2—2 of FIG. 1.

FIG. 3 is a sectional view, taken on line 3—3 of FIG. 1.

DETAILED DESCRIPTION OF PREFERRED EMBODIMENTS

Referring now to FIGS. 1—3, the pan 1 of the invention comprises a plurality of elongate parallel tapered ridges 2 narrower at the top. Each ridge tapers enough so that when a taco 3 is inverted and placed astride a ridge, the ends 4 are gently opened and held open during baking in either a hot oven or a microwave oven. The pan will be made of metal for a hot oven and a non-metal for a microwave oven. If not held open during baking, many shells will close up, and then break when opened for filling. Each pair of parallel ridges 2 defines a trough 5 therebetween. The crisp baked shell 6 is turned upright and placed in the trough 5 for filling. The bottom 9 of the trough is rounded in a shape to generally conform to the bend 10 in the taco so that the shell is supported effectively by a large surface during filling to prevent the shells from cracking. The cross section of the pan, as best seen in FIG. 2, is generally of a sinusoidal configuration with smooth contours for easy cleaning.

At each end 7 of each trough, an upwardly sloping stop element 8 rises from the bottom of the trough. This is high enough at both trough ends hold any contents spilled from the taco within the trough. It also prevents the tacos from sliding from the pan if it is tilted. The stop element also serves another purpose. As a person slides the taco over the stop element 8, the bottom of the taco rides up on the element and is lifted up high enough that a person can slide fingers under the taco as it emerges from the trough to pick it up from underneath. If instead a filled taco is lifted by its top there is a tendency to squeeze the ends together excessively, sometimes cracking the shell. This is especially true of people with unsteady hands.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A taco pan for holding tacos open while baking and for supporting tacos from below while filling and serving, the pan comprising:

a single sheet formed into the following configuration;

a plurality of elongate parallel upstanding tapered ridges, each ridge arranged for supporting and holding open an inverted taco shell thereon while baking;

at least one trough defined by a pair of adjacent ridges, the trough having a length greater than the length of a taco shell and having a bottom with a rounded configuration to generally conform to the normal bending radius of a formed taco shell for supporting an upright shell therein during filling and serving; and a sloping stop element rising from the bottom of the trough at each end thereof to be capable of containing within the trough the filled taco and any contents that might spill therefrom, the sloping stop element also being capable of gradually lifting the filled taco as it is moved to the end to thereby enable a person to lift the filled taco from underneath.

2. The taco pan according to claim 1 formed from metal for baking in a hot oven.

3. The taco pan according to claim 1 formed from a non-metallic material for use in a microwave oven.

4. A taco pan for holding tacos open while baking and for supporting tacos from below while filling and serving, the pan comprising:

a single sheet formed into the following configuration;

a plurality of upstanding tapered parallel ridges defining a plurality of elongate troughs therebetween and having a generally sinusoidal cross section, each ridge having a length greater than the length of a taco and capable of holding open an inverted taco positioned thereon for baking;

each trough having a bottom with a bend generally conforming to the bend in a taco shell for supporting an upright shell thereon for filling and serving;

a stop element sloping upward from the bottom of the trough at each end thereof high enough to contain the taco and any spilled contents within the trough, said stop element capable of gradually lifting up the bottom of the taco as the taco is slid along to the end of the trough so that the taco may be grasped from underneath for eating.

5. The taco pan according to claim 4 formed from metal for baking in a hot oven.

6. The taco pan according to claim 4 formed from a non-metallic material for use in a microwave oven.

7. A taco pan for holding tacos open while baking and for supporting tacos from below while filling and serving, the pan comprising:

a plurality of upstanding tapered parallel ridges defining a plurality of elongate troughs therebetween and having a generally sinusoidal cross section, each ridge having a length greater than the length of a taco and capable of holding open an inverted taco positioned thereon for baking;

each trough having a bottom with a bend generally conforming to the bend in a taco shell for supporting an upright shell thereon for filling and serving, the bottom of the trough having opposed ends, and being provided with a gradually upwardly sloping bend as each end is approached to thereby form a stop element sloping upward from the bottom of the trough at each end thereof high enough to contain the taco and any spilled contents within the trough, said stop element capable of gradually lifting up the bottom of the taco as the taco is slid along to the end of the trough so that the taco may be grasped from underneath for eating.

8. The taco pan according to claim 7 formed from metal for baking in a hot oven.

9. The taco pan according to claim 7 formed from a non-metallic material for use in a microwave oven.

* * * * *